United States Patent
Kim

(10) Patent No.: US 8,724,599 B2
(45) Date of Patent: May 13, 2014

(54) METHOD FOR CONNECTING TO WIRELESS LAN ACCESS POINT AND APPARATUS USING THE SAME

(75) Inventor: Han Soo Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 740 days.

(21) Appl. No.: 12/589,577

(22) Filed: Oct. 26, 2009

(65) Prior Publication Data

US 2010/0103844 A1   Apr. 29, 2010

(30) Foreign Application Priority Data

Oct. 27, 2008  (KR) .................. 10-2008-0105134

(51) Int. Cl.
  *H04W 4/00*   (2009.01)

(52) U.S. Cl.
  USPC ...... 370/338; 455/434; 455/456.1; 455/552.1

(58) Field of Classification Search
  None
  See application file for complete search history.

(56) References Cited

U.S. PATENT DOCUMENTS

| 6,167,268 | A  | * | 12/2000 | Souissi et al. ................. 455/434 |
| 7,403,762 | B2 | * | 7/2008  | Morgan et al. ............. 455/404.2 |
| 7,839,814 | B2 | * | 11/2010 | Narasimha et al. ........... 370/328 |
| 2002/0187750 | A1 | * | 12/2002 | Majumdar ...................... 455/41 |
| 2004/0033812 | A1 |   | 2/2004  | Matsunaga et al. |
| 2004/0259546 | A1 | * | 12/2004 | Balachandran et al. ... 455/435.2 |
| 2006/0063560 | A1 | * | 3/2006  | Herle .......................... 455/552.1 |
| 2007/0091847 | A1 | * | 4/2007  | Lee ............................... 370/331 |
| 2007/0184835 | A1 | * | 8/2007  | Bitran et al. .................. 455/434 |
| 2008/0008121 | A1 | * | 1/2008  | Alizadeh-Shabdiz ........ 370/328 |
| 2008/0117862 | A1 | * | 5/2008  | Yeshayahu et al. ........... 370/328 |
| 2009/0103503 | A1 | * | 4/2009  | Chhabra ....................... 370/338 |

FOREIGN PATENT DOCUMENTS

| JP | 2003-108271 | 4/2003 |
| JP | 2008-66781  | 3/2008 |

* cited by examiner

*Primary Examiner* — Brian Roberts

(57) ABSTRACT

A method and system for connecting to a wireless LAN Access Point (AP) using position information and an apparatus using the same. The method and system includes scanning APs in a preset period, determining a current position of an AP access apparatus based on the scanned APs, calculating distances between the current position of the AP access apparatus and each of positions of one or more user-designated APs, controlling a scan period in response to the calculated distances, and, when the user-designated APs are scanned, accessing the scanned user-designated APs. In scanning the nearby positioned wireless LAN AP and accessing the scanned AP, the power consumption can be reduced and the access time to AP can also be reduced.

20 Claims, 5 Drawing Sheets

METHOD FOR CONNECTING TO WIRELESS LAN ACCESS POINT AND APPARATUS USING THE SAME

CROSS-REFERENCE TO RELATED APPLICATION(S) AND CLAIM OF PRIORITY

The present application is related to and claims the benefit under 35 U S. C. §119 (a) of a Korean patent application filed in the Korean Intellectual Property Office on Oct. 27, 2008 and assigned Serial No. 10-2008-0105134, and the entire disclosure of which is hereby incorporated by reference.

TECHNICAL FIELD OF THE INVENTION

The present invention relates to a method for connecting to a wireless Local Area Network (LAN) Access Point (AP) and an apparatus using the same, and more particularly, to a method of accessing a wireless LAN AP using position information and an apparatus using the same.

BACKGROUND OF THE INVENTION

A 'wireless LAN' is configured to provide communication services, such as the Internet, to wireless terminals (e.g., a Personal Digital Assistant (PDA), a notebook computer, and so forth) placed within a certain distance from a location where an Access Point (AP) is installed. The wireless LAN had the range of coverage of at most ten (10) meters at the early stage, but, in the 2000s, the range of coverage has widely expanded from fifty (50) meters to several hundreds of meters. Furthermore, the transmission speed of the wireless LAN has also been increased and is able to transmit and receive high-capacity multimedia. Accordingly, the wireless LAN can be used to supply a high-speed data service to subscribers who are in buildings such as schools, airports, and hotels.

As the wireless LAN service is commercialized, a terminal in which a mobile communication terminal and a Wireless Fidelity (Wi-Fi) terminal providing the wireless LAN service are mixed together has been developed. A terminal capable of using both the wireless LAN service and the mobile communication service is called a 'dual mode terminal'.

The dual mode terminal includes a wireless LAN module for the wireless LAN service and a mobile communication module (e.g., CDMA module) for the mobile communication service. In case the dual mode terminal enters a wireless LAN service coverage, it operates in a wireless LAN service mode, whereas the dual mode terminal gets out of the wireless LAN service coverage, it operates in the mobile communication service mode. When the dual mode terminal enters or gets out of the wireless LAN service coverage, the operation mode of the terminal is switched. Here, the switch of the terminal can be manually performed by a user or can be automatically performed.

The dual mode terminal periodically scans accessible APs and accesses a scanned AP, such that the operation mode of the dual mode terminal is automatically switched. The scan period can be variably set from a short period of several tens of seconds to a long period of several minutes. If the scan period is set to be short, the access time to the AP can be reduced as scan results can be known quickly. However, a problem can occur wherein the battery power is quickly consumed as the power consumption increases due to frequent scanning.

Conversely, if the scan period is set to be long, the power consumption can be reduced to increase the battery usage time. However, a problem can occur wherein the access time to the AP can be increased.

A portable terminal has a limited battery power. Thus, if the power consumption is great, there exists an inconvenience that the user has to frequently charge the battery or replace the battery with another battery. Further, if the scan period is set to be long so as to reduce the power consumption, the efficient network access cannot be performed due to the AP access time delay.

Accordingly, there exists a necessity of a method for accessing a wireless LAN capable of reducing power consumption with reducing the access time to an AP.

SUMMARY OF THE INVENTION

To address the above-discussed deficiencies of the prior art, it is a primary object to provide a method of accessing a wireless LAN AP and an apparatus using the same that is capable of reducing power consumption with reducing the access time to an AP.

In accordance with a first embodiment of the present invention, a method of accessing an Access Point (AP) includes: a scan step of scanning an AP in a preset period; a current position determination step of determining a current position of an AP access apparatus based on the scanned AP; a distance calculation step of calculating a distance between the current position of the AP access apparatus and at least one user-designated AP; a scan period control step of controlling a scan period in response to the calculated distance; and an AP access step of accessing the scanned user-designated AP when the user-designated APs are scanned.

Preferably, the current position determination step uses a Wi-Fi Positioning System (WPS).

In accordance with a second embodiment of the present invention, a method of accessing an Access Point (AP) includes: a current position determination step of determining a current position of an AP access apparatus; a distance calculation step of calculating a distance between the current position of the AP access apparatus and at least one user-designated AP; a scanning start step of beginning scanning when a shortest distance of the calculated distance is smaller than a preset critical distance; and an AP access step of accessing the scanned user-designated AP when the user-designated AP is scanned.

Preferably, the current position determination step uses a Global Positioning System (GPS) or an Assisted Positioning System (A-GPS).

In accordance with a first embodiment of the present invention, an AP access apparatus includes: a wireless LAN module that scans an AP and accesses the scanned AP; a storage unit that stores information of at least one user-designated AP; a WPS unit that determines a current position of the AP access apparatus; and a controller that calculates a distance between the current position of the AP access apparatus determined by the WPS unit and at least one user-designated AP stored in the storage unit, and controls a scan period in response to the calculated distance.

Preferably, the WPS unit determines the current position of the AP access apparatus based on the AP map data and the AP scanned by the wireless LAN module.

In accordance with a second embodiment of the present invention, an AP access apparatus includes: a wireless LAN module that scans an AP, and accesses the scanned AP; a storage unit that stores information of at least one user-designated AP; a GPS module unit that receives a GPS signal;

and a controller that calculates a distance between a current position of the AP access apparatus determined by the GPS module unit and the at least one user-designated AP stored in the storage unit, and controls the wireless LAN module to begin the AP scan when a shortest distance of the calculated distance is smaller than a preset critical distance.

According to the present invention, in scanning the nearby positioned wireless LAN AP and accessing the scanned AP, the power consumption can be reduced and the access time to AP can also be reduced. Accordingly, efficient wireless LAN access is possible.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

In the present invention, a terminology 'user-designated AP list' means an AP list which is set and stored by a terminal user. The user-designated AP list can include APs that are frequently used by a user. A user can select specific APs and store them in the user-designated AP list. Information of user-designated APs, such as Media Access Control (MAC) addresses, is stored in the user-designated AP list.

In the present invention, a WPS (Wi-Fi Positioning System) corresponds to a service for confirming the position of a user based on the distance from a wireless LAN AP. Furthermore, a terminology 'WPS unit' corresponds to a position identification software installed within a portable terminal. The WPS unit is configured to confirm the current position of a portable terminal based on the MAC address of each AP received through a wireless LAN module. The WPS unit uses 'AP map data' when confirming the current position of a portable terminal.

In the present invention, the AP map data means a data including position information of wireless LAN APs. The AP map data includes position information, such as the longitude and latitude of each AP, and map data. The AP map data corresponds to data used by the WPS unit when confirming the current position of a portable terminal.

Exemplary embodiments of the present invention are described with reference to the accompanying drawings in detail. The same reference numbers are used throughout the drawings to refer to the same or like parts. Detailed descriptions of well-known functions and structures incorporated herein can be omitted to avoid obscuring the subject matter of the present invention.

Furthermore, although a portable terminal is exemplified in the embodiments of the present invention, the present invention is not limited to the portable terminal. The portable terminal according to the embodiments of the present invention includes a terminal equipped with a wireless LAN module, preferably, includes all information communication devices, multimedia devices and applications thereof, such as a mobile communication terminal, a portable multimedia player (PMP), a personal digital assistant (PDA), a smart phone, and a MP3 player.

Figure 1:
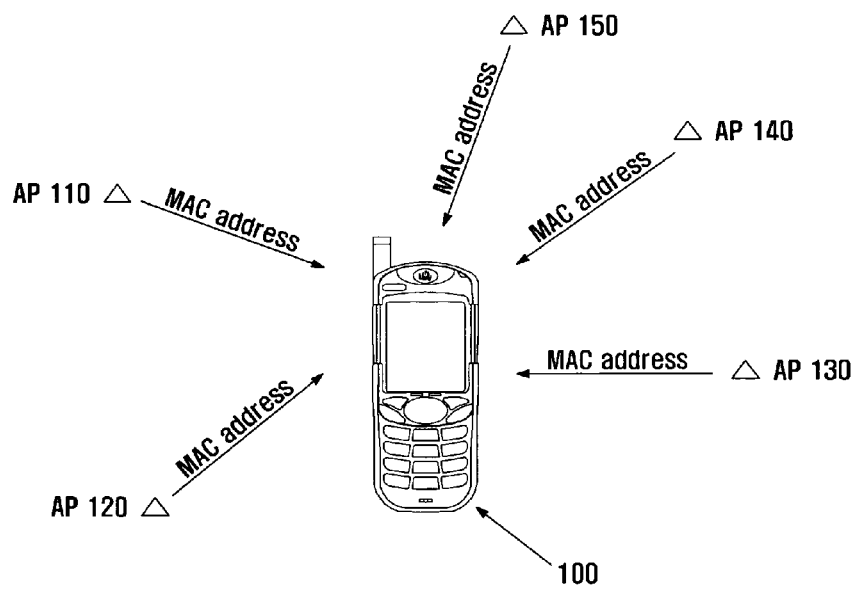
FIG. 1 illustrates a diagram of a Wi-Fi Positioning System (WPS) according to an exemplary embodiment of the present invention.

FIG. 1 illustrates a diagram of a WPS according to an exemplary embodiment of the present invention.

In the WPS, a portable terminal 100 scans neighboring APs so as to confirm the current position of the portable terminal 100. The scan method includes two types including an active scan method and a passive scan method. In the active scan method, a terminal transmits a probe request signal for searching for surrounding APs, while an AP that has received the probe signal transmits a probe response signal including a MAC address and several parameters necessary for the access, to the terminal. The active scan method is usually used in a portable terminal having a low, battery capacity (e.g., a mobile communication terminal, PDA, and MP3).

In the passive scan method, a beacon signal reception standby state is maintained while the portable terminal 100 receives a beacon signal from a nearby AP. Here, the beacon signal includes several parameters for the AP access such as a MAC address and so on. The passive scan method is usually used in devices having a high battery capacity, such as a notebook computer.

Hereinafter, a method and apparatus for accessing a wireless LAN AP is described on the basis of the active scan method. However, the present invention is not limited to the active scan method, but may be applied to the passive scan method.

The portable terminal 100 begins scanning by broadcasting a probe request signal. APs 110 to 150 that have received the probe request signal transmit probe response signals to the terminal 100. The probe response signal received from the APs 110 to 150 includes not only a MAC address, but several parameters necessary for the AP access. The MAC address is an address of an AP recognized by the portable terminal 100, and all APs include a unique MAC address. The portable terminal 100 distinguishes the APs that have transmitted the probe response signals on the basis of the MAC address.

The portable terminal 100 determines the current position of the portable terminal 100 based on the MAC addresses received from the APs 110 to 150. The portable terminal 100 stores AP map data including the position information of the APs, and determines its current position through the AP map data and the MAC addresses received from the APs 110 to 150. The current position of the portable terminal 100 is determined based on the positions of the each APs stored in the AP map data.

Figure 2:
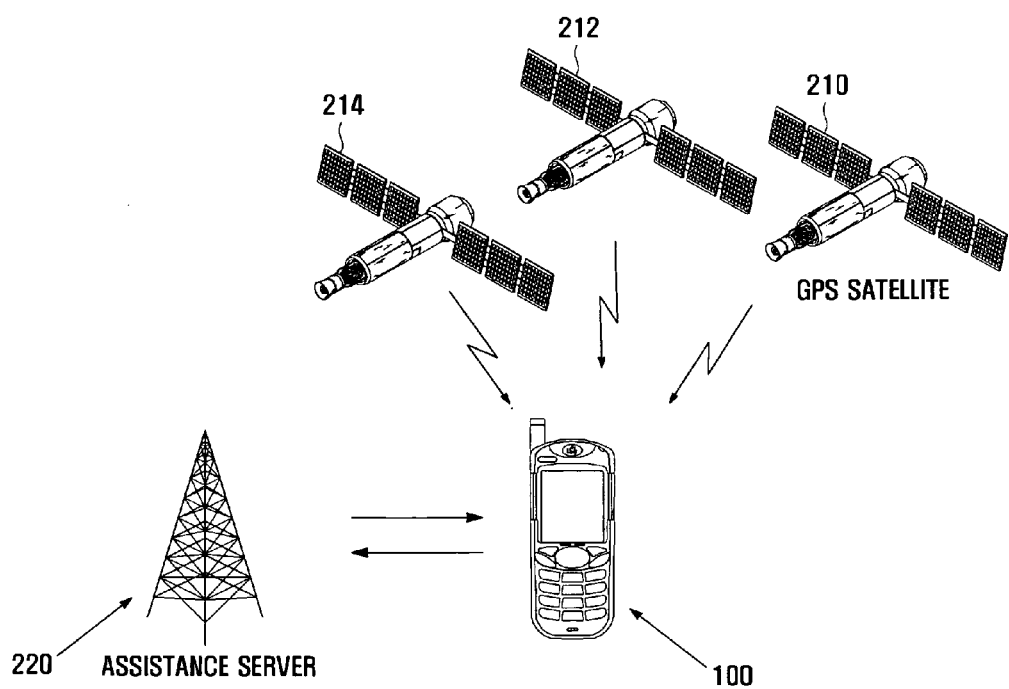
FIG. 2 illustrates a diagram of a Global Positioning System (GPS) and an Assisted Global Positioning System (A-GPS) according to an exemplary embodiment of the present invention.

FIG. 2 illustrates a diagram of a Global Positioning System (GPS) and an Assisted Global Positioning System (A-GPS) according to an exemplary embodiment of the present invention.

The portable terminal 100 receives GPS signals from GPS satellites 210, 212, and 214 using a GPS module. The portable terminal 100 can confirm the current position of the portable terminal 100 based on the received GPS signals. A system, including the GPS satellites 210, 212, 214 and the portable terminal 100 equipped with a GPS module, is called GPS.

The A-GPS is a system in which a GPS and a mobile communication network method are combined and is configured to further include an assistance server 220, as compared with the GPS. The portable terminal 100 and the assistance server 220 are configured to transmit or receive information over a mobile communication network. The assistance server 220 can provide the portable terminal 100 with assistant data, such as satellite orbit information and error information, to the portable terminal 100 such that the satellite search range of the portable terminal 100 can be decreased. In addition, the assistance server 220 can directly receive GPS signals from the GPS satellites and provide the portable terminal 100 with position information.

In the second exemplary embodiment of the present invention, the current position of the portable terminal 100 is confirmed using the GPS or the A-GPS, and then the distance from a user-designated AP is calculated to determine the beginning of the scanning of wireless LAN.

Figure 3:
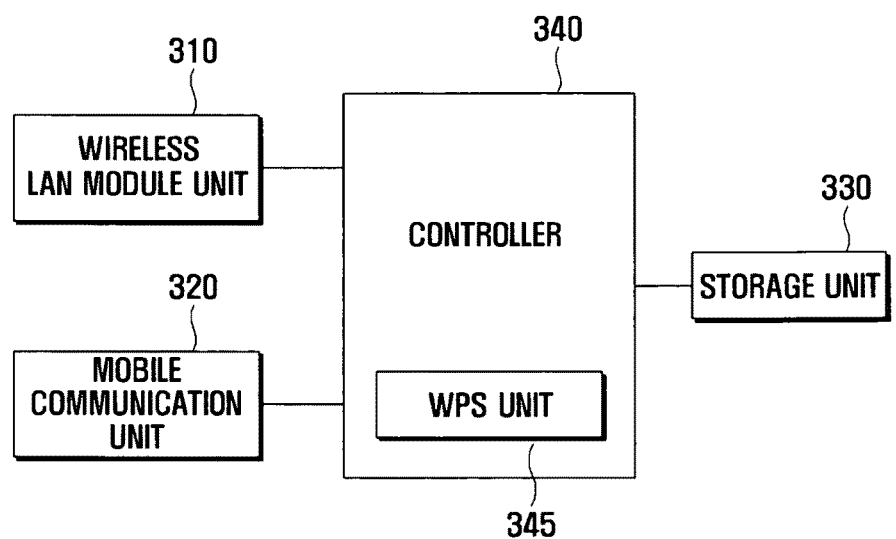
FIG. 3 illustrates a diagram of the elements of a portable terminal 100 according to an exemplary embodiment of the present invention.

FIG. 3 illustrates a diagram of the elements of the portable terminal 100 according to an exemplary embodiment of the present invention.

The terminal 100 according to the exemplary embodiment of the present invention includes a wireless LAN module unit 310, a mobile communication unit 320, a storage unit 330, and a controller 340.

The wireless LAN module unit 310 corresponds to an element configured to perform a wireless LAN. The wireless LAN module unit 310 according to the exemplary embodiment of the present invention is configured to broadcast a probe request signal and receive a probe response signal from APs that have responded to the probe request signal. Furthermore, the wireless LAN module unit 310 also plays the role of accessing to a scanned AP over a network.

The mobile communication unit 320 transceives corresponding data for wireless communication of a mobile communication terminal. The mobile communication unit 320 can include an RF transmitter that up-converts and amplifies the frequency of a transmitted signal, and an RF receiver that low-noise amplifies a received signal and down-converts the frequency of the signal. Furthermore, the mobile communication unit 320 can receive data through a wireless channel and output to the controller 340, and transmit data outputted from the controller 340 through the wireless channel.

The storage unit stores programs and data necessary for the operation of the portable terminal 100. The storage unit 330 according to the exemplary embodiment of the present invention is configured to store a user-designated AP list. The user-designated AP list is a list of APs that are directly set and stored by a user and can include APs that are frequently used by a user. Furthermore, the storage unit 330 according to the exemplary embodiment of the present invention plays the role of storing AP map data. The AP map data includes position information regarding the positions of respective APs and map data.

The controller 340 is configured to control an overall operation for the elements of the portable terminal 100. The controller 340 according to the first exemplary embodiment of the present invention includes a WPS unit 345.

The WPS unit 345 is configured to confirm the current position of the portable terminal 100 by using MAC addresses received through scanning performed by the wireless LAN module unit 310 and AP map data stored in the storage unit 330.

The controller 340 receives the current position of the portable terminal 100 from the WPS unit 345, and calculates the distances between the current position of the portable terminal 100 and the position of user-designated AP included in a user-designated AP list stored in the storage unit 330. The controller 340 confirms a scan period corresponding to the shortest distance of the calculated distances, and controls the wireless LAN module unit 310 to perform scanning with the scan period corresponding to the shortest distance. Furthermore, the controller 340 can determine a scan period by comparing a preset critical distance with the shortest distance among the distances between the current position of the portable terminal 100 and the user-designated AP.

Figure 4:
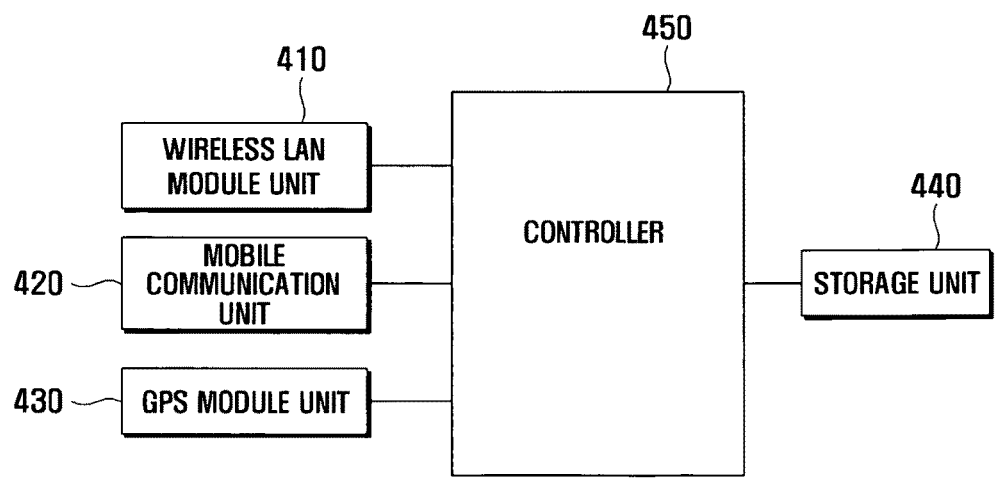
FIG. 4 illustrates a diagram of the elements of a portable terminal 100 according to an exemplary embodiment of the present invention.

FIG. 4 illustrates a diagram of the elements of a portable terminal 100 according to an exemplary embodiment of the present invention.

The portable terminal 100 includes a wireless LAN module unit 410, a mobile communication unit 420, a GPS module unit 430, a storage unit 440, and a controller 450.

Since the wireless LAN module unit 410, the mobile communication unit 420, and the storage unit 440 have the same characteristic as the wireless LAN module unit 310, the mobile communication unit 320, and the storage unit 330 described with reference to FIG. 3, a description thereof is omitted.

The GPS module unit 430 is configured to receive GPS signals from a GPS satellite and transmit information regarding the current position of the portable terminal 100 to the controller 450.

The controller 450 receives the current position information of the portable terminal 100 from the GPS module unit 430, and calculates the distances between the current position of the portable terminal 100 and the user-designated AP included in a user-designated AP list stored in the storage unit 440. The controller 450 determines whether the shortest distance between the current position of the portable terminal 100 and the user-designated AP is smaller than a preset critical distance. If the shortest distance is determined to be smaller than the preset critical distance, the controller 450 controls the wireless LAN module 410 so that it begins scanning in a preset period. Such scanning is performed by the wireless LAN module 410 transmitting a probe request signal in the preset period while receiving probe response signals including MAC addresses from APs that have received the probe request signal. The preset period can be a period of several seconds and can be a minimum period of preset scan periods.

Figure 5:
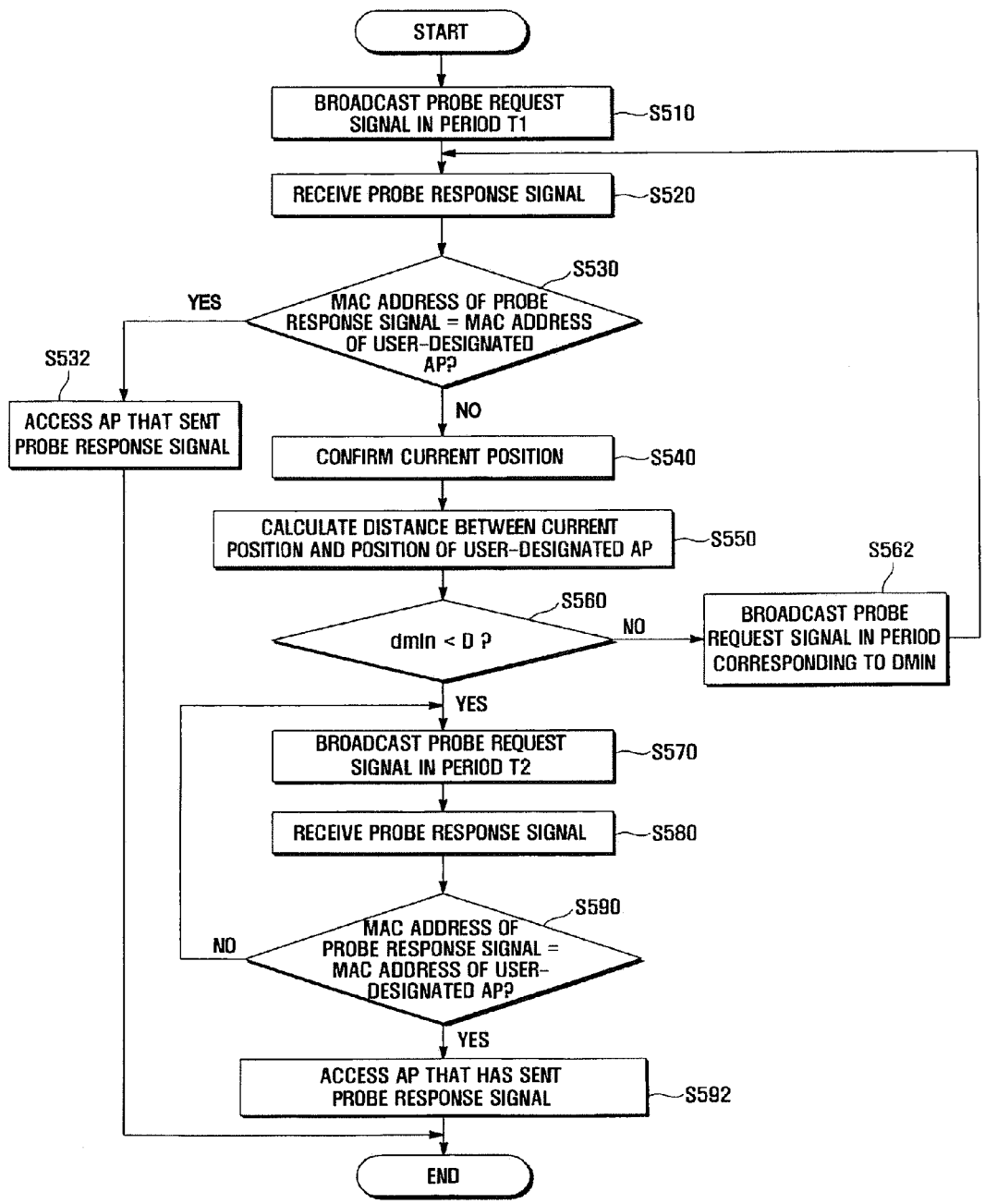
FIG. 5 illustrates a flowchart for a method of accessing a wireless LAN AP according to an exemplary embodiment of the present invention.

FIG. 5 illustrates a flowchart for a method of accessing a wireless LAN AP according to an exemplary embodiment of the present invention.

The controller 340 controls the wireless LAN module 310 to broadcast a probe request signal in a preset period (S510). It is assumed that the period of the probe request signal broadcasted at step S510 is set to T1. T1 corresponds to a period where the probe request signal is broadcasted when the wireless LAN module 310 performs scanning for the first time. T1, that is basically set, can be a scan period of several minutes, and can be a maximum period of preset scan periods When the wireless LAN module 310 receives a probe response signal (S520), the controller 340 checks the MAC address included in the received probe response signal, and determines whether the MAC addresses is identical with MAC addresses stored in a user-designated AP list (S530). If the MAC addresses received at step S520 is identical with the MAC address stored in the user-designated AP list, the controller 340 determines the AP that sent the probe response signal as an AP to which a user wants to access (S532), and controls the wireless LAN module 310 to access to a corresponding AP.

If the received MAC address is not identical with the MAC addresses stored in the user-designated AP list, the controller 340 controls the WPS unit 345 to calculate the current position (S540). The WPS unit 345 determines the current position of the portable terminal 100 by using the MAC addresses received at step S520 and the AP map data stored in the storage unit 330.

When the current position information of the portable terminal 100 is received from the WPS unit 345, the controller 340 calculates the distance between the APs stored in the user-designated AP list and the current position of the portable terminal 100 by using the AP map data (S550). For example, when three AP information is stored in the user-designated AP list (AP1, AP2, and AP3 of FIG. 7), the controller 340 calculates the distances between the current position of the portable terminal 100 and the position of the three APs respectively.

The controller 340 determines whether the shortest distance of the calculated distances is smaller than a preset critical distance (S560). A value, 'dmin', indicates the shortest distance of the calculated distances between the current position of the portable terminal 100 and the user-designated AP. A value, 'D', indicates the preset critical distance. 'D' is a distance used to determine whether the portable terminal 100 is close to the AP, and can be set or changed by a user. When 'D' increases, an approach range is expanded, whereas, when 'D' decreases, an approach range is narrowed. If the condition 'D>dmin' is fulfilled, it means that a user-designated AP exists within an approach range from the current position of the portable terminal 100.

If, in step S560, the condition 'D>dmin' is fulfilled, the controller 340 controls the wireless LAN module 310 to broadcast the probe request signal in a period T2. The period T2 is smaller than the period T1 at step S510. The wireless LAN module 310 broadcasts the probe request signal more frequently than at step S510. The period T2 according to an exemplary embodiment of the present invention can be a minimum period of preset scan periods.

When the wireless LAN module 310 receives the probe response signal (S580), the controller 340 checks the MAC address included in the received probe response signal and determines whether the MAC address included in the received probe response signals is identical with the MAC addresses stored in the user-designated AP list (S590). Since the wireless LAN module 310 performs quick scanning (broadcasts the probe request signal in the period T2) around the user-designated AP, there is a high possibility that the probe response signal can be received from the user-designated APs.

If, as a result of the determination at step S590, the received MAC addresses is determined to be identical with the MAC addresses stored in the user-designated AP list, the controller 340 determines the AP that sent the probe response signal as an AP to which the user wants to access and controls the wireless LAN module 310 to access to a corresponding AP (S592).

If, in step S560, the condition 'D>dmin' is not fulfilled, the controller 340 controls the wireless LAN module unit 310 to transmit a probe request signal in a period corresponding to 'dmin' at step S562. A corresponding scan period is set according to a distance value between the current position of the portable terminal 100 and the user-designated AP. The controller 340 controls the wireless LAN module unit 310 to transmit the probe request signal in a period corresponding to 'dim' calculated at step S550.

The scan period can be longer than or shorter than the period T1 set at step S510 depending on the value 'drain', but is, in general, longer than the period T2. The controller 340 flexibly controls the scan period based on the distance between the current position of the portable terminal 100 and the user-designated AP.

Figure 6:
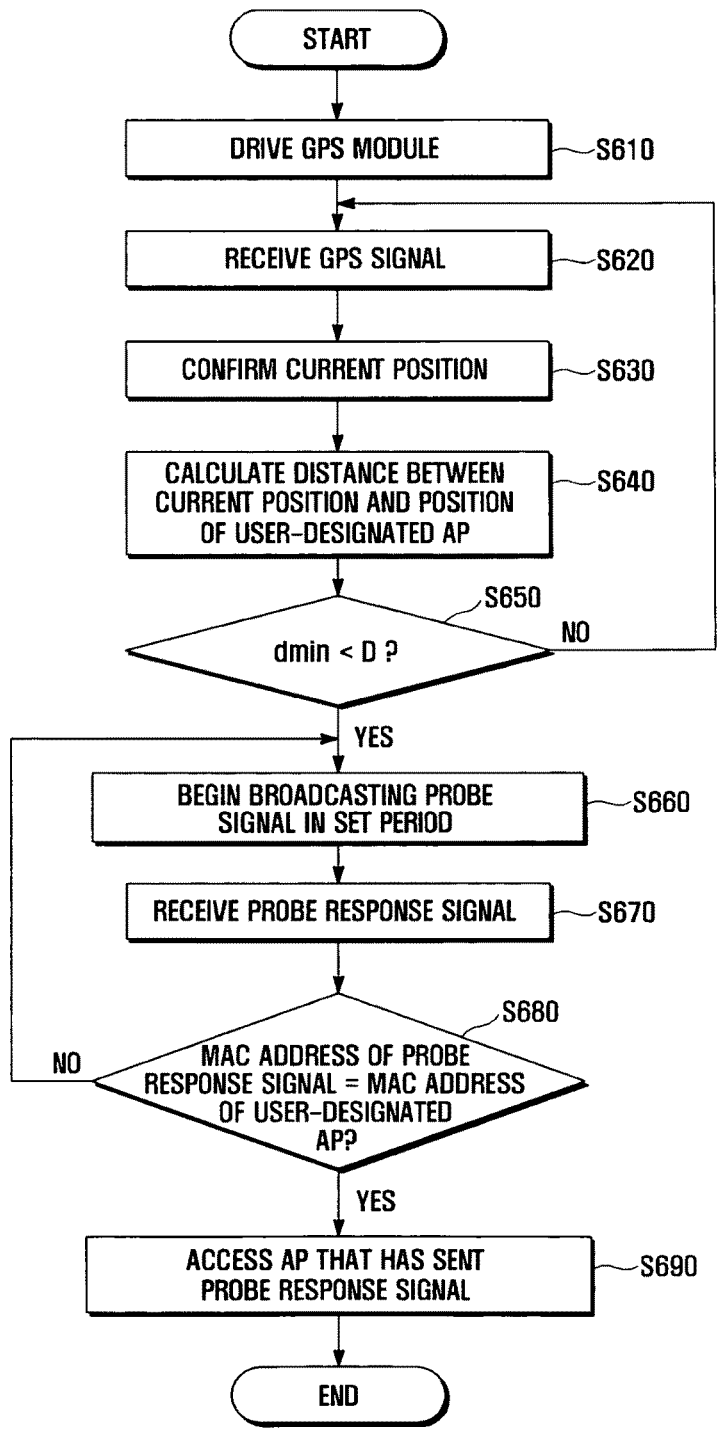
FIG. 6 illustrates a flowchart for a method of accessing a wireless LAN AP according to an exemplary embodiment of the present invention.

FIG. 6 illustrates a flowchart for a method of accessing a wireless LAN AP according to an exemplary embodiment of the present invention.

The controller 450 operates the GPS module 430 (S610). The portable terminal 100 can receive a GPS signal by operating the GPS module 430. When the GPS module 430 receives the GPS signal from the GPS satellite (S620), the GPS module 430 checks information of current position of the portable terminal 100 (S630). The current position information of the portable terminal 100 is transmitted to the controller 450. The controller 450 calculates the distances between the AP stored in a user-designated AP list and the current position of the portable terminal 100 by using the AP map data (S640).

For example, when three APs are included in the user-designated AP list, the controller 450 calculates the distances between the current position of the portable terminal 100 and the three APs.

The controller 450 determines whether the shortest distance of the calculated distances is smaller than a preset critical distance (S650). The value, 'dmin', indicates the shortest distance of the calculated distances between the current position of the portable terminal 100 and the user-designated APs. The value, 'D', indicates a preset critical distance. 'D' is a distance used to determine whether the portable terminal 100 is close to the APs, and can be set by a user. If the condition 'D>dmin' is fulfilled, it means that a user-designated AP exists within an approach range from the current position of the portable terminal 100.

If, in step S650, 'D>dmin' is fulfilled, the controller 450 controls the wireless LAN module 410 to begin broadcasting a probe request signal in a preset period (S660). The preset period can be a period of several seconds or can be a minimum period of preset scan periods.

When the wireless LAN module 410 receives a probe response signal (S670), the controller 450 checks the MAC address included in the received probe response signal, and determines whether the MAC address included in the received probe response signal is identical with the MAC address stored in the user-designated AP list (S680). Since the wireless LAN module 410 performs quick scanning around the user-designated AP, there is a high possibility that the probe response signal can be received from the user-designated AP.

If, in 5680, the received MAC address is identical with the MAC address stored in the user-designated AP list, the controller 450 determines the AP that sent the probe response signal as an AP to which the user wants to access, and controls the wireless LAN module 410 to access to a corresponding AP (S690).

Figure 7:
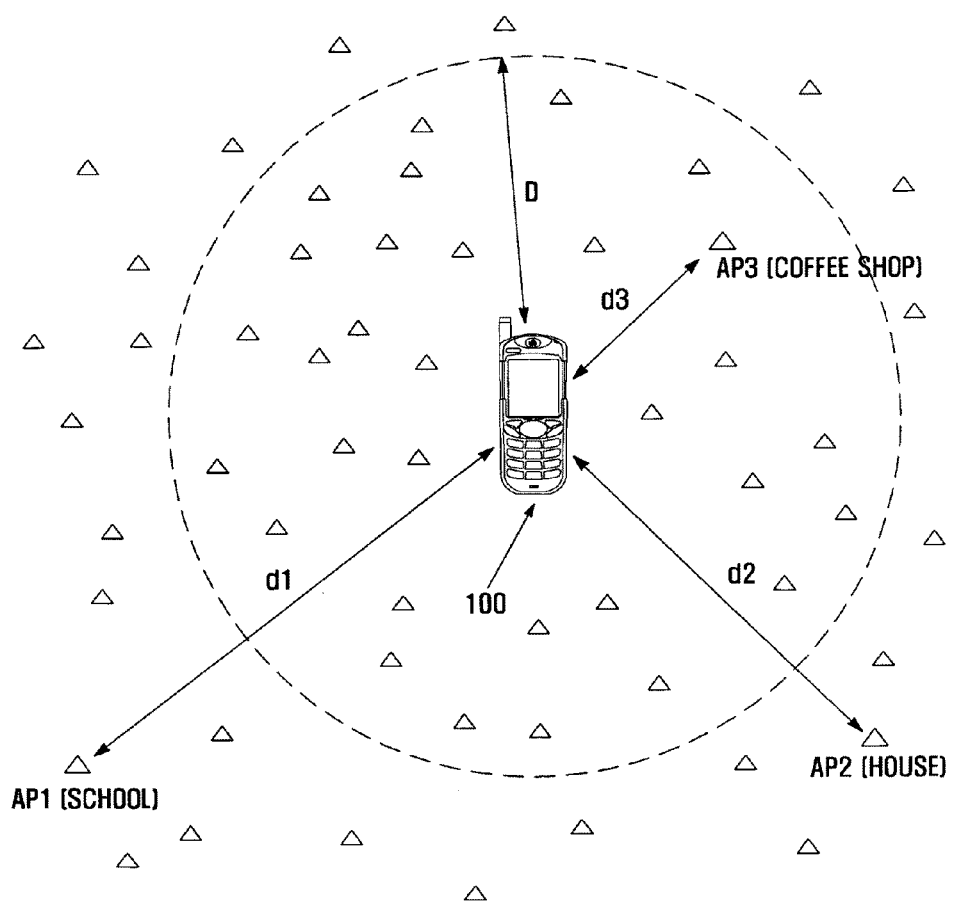
FIG. 7 illustrates a diagram of the calculation of a distance between a user-designated AP and a current position of a portable terminal based on AP map data according to an exemplary embodiment of the present invention.

FIG. 7 illustrates a diagram for the calculation of a distance between a user-designated AP and a current position of a portable terminal based on AP map data according to an exemplary embodiment of the present invention.

The illustrated AP map data includes information of position of a plurality of APs. AP1 (school), AP2 (house), and AP3 (coffee shop) of the plurality of APs correspond to a user-designated AP. The controller 340, 450 extracts MAC addresses of AP1, AP2, and AP3 from a user-designated AP list stored in the storage unit 330, 440, and confirms the positions of the AP1, AP2, and AP3 by matching the extracted MAC addresses to the AP map data. The current position of the portable terminal 100 can be confirmed by using a WPS or a GPS/A-GPS, and the confirmed position information is matched to the AP map data.

The controller 340, 450 calculates the distance d1, d2, and d3 between the current position of the portable terminal 100 and the position of the AP1, AP2, and AP3 respectively. Here, 'drain' (the shortest distance) corresponds to the distance d3. The controller 340, 450 determines whether the distance d3 is smaller than an approach range D. According to a result of the determination, the controller 340 according to the first exemplary embodiment controls a period of probe request signal broadcasting based on the calculated dmin, and the controller 450 according to the second exemplary embodiment controls the wireless LAN module 410 to begin broadcasting of probe request signal when the condition D<dmin is fulfilled.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for accessing at least one Access Point by a portable terminal, the method comprising:
scanning one or more Access Points (APs) during a first scan period;
determining whether at least one of the scanned APs is identical with at least one of predetermined APs stored in the portable terminal;
calculating at least one distance between a current position of the portable terminal and the at least one of the scanned APs identical with the at least one of the predetermined APs by using a position information of the at least one of the predetermined APs stored in the portable terminal; and
adjusting the first scan period into a second scan period when the at least one distance is within a predetermined distance.

2. The method of claim 1, wherein scanning the one or more APs includes:
transmitting a probe request signal during the first scan period; and
receiving at least one probe response signal, each probe response signal including a Media Access Control (MAC) address from one scanned AP that received the probe request signal.

3. The method of claim 1, wherein the second scan period is smaller than the first scan period.

4. The method of claim 1, wherein:
calculating the at least one distance comprises calculating multiple distances between the current position of the portable terminal and multiple predetermined APs; and
the method further comprises selecting whether to (i) adjust the first scan period into the second scan period or (ii) adjust the first scan period based on a shortest distance among the multiple distances.

5. The method of claim 4, further comprising:
comparing the shortest distance with the predetermined distance.

6. The method of claim 5, wherein adjusting the first scan period into the second scan period includes adjusting the first scan period into a minimum period when the shortest distance is within the predetermined distance.

7. The method of claim 1, further comprising:
accessing one of the one or more scanned APs;
wherein the accessed AP represents one of the one or more predetermined APs.

8. The method of claim 1, further comprising:
adjusting the first scan period in response to the at least one distance when the at least one distance is not within the predetermined distance.

9. A portable terminal comprising:
a wireless Local Area Network (LAN) module that is configured to perform a first scan for one or more Access Points (APs) during a first scan period and a second scan for one or more APs during a second scan period;
a storage unit that is configured to store information associated with one or more predetermined APs, the information comprising position information of the predetermined APs;
a Wireless Fidelity (Wi-Fi) Positioning System (WPS) unit that is configured to determine a current position of the portable terminal; and
a controller that is configured to determine whether at least one of the scanned APs is identical with at least one of the predetermined APs and calculate at least one distance between the current position of the portable terminal and the at least one of the scanned APs identical with the at least one of the predetermined APs by using the position information;
wherein the controller is also configured to adjust the first scan period into the second scan period when the at least one distance is within a predetermined distance;
wherein the second scan period is shorter than the first scan period.

10. The portable terminal of claim 9, wherein the information associated with the one or more predetermined APs includes AP map data.

11. The portable terminal of claim 10, wherein the AP map data includes AP position information.

12. The portable terminal of claim 10, wherein the WPS unit is configured to determine the current position of the portable terminal based on the AP map data and at least one of the one or more APs scanned by the wireless LAN module.

13. The portable terminal of claim 9, wherein the wireless LAN module is configured to:
    transmit a probe request signal during the second scan period; and
    receive at least one probe response signal, each probe response signal including a Media Access Control (MAC) address from one AP that received the probe request signal.

14. The portable terminal of claim 9, wherein the controller is configured to:
    calculate multiple distances between the current position of the portable terminal and multiple predetermined APs; and
    select whether to (i) adjust the first scan period into the second scan period or (ii) adjust the first scan period in response to a shortest distance among the multiple distances.

15. The portable terminal of claim 14, wherein the controller is further configured to compare the shortest distance with the predetermined distance.

16. The portable terminal of claim 15, wherein the controller is configured to adjust the first scan period into a minimum period when the shortest distance is within the predetermined distance.

17. The portable terminal of claim 9, wherein the controller is further configured to adjust the first scan period in response to the at least one distance when the at least one distance is not within the predetermined distance.

18. For use in a portable terminal, an apparatus comprising:
    a controller configured to:
        identify at least one distance between a current position of the portable terminal and at least one of one or more scanned Access Points (APs) identical with at least one of predetermined APs stored in the portable terminal; and
        adjust a scan period for scanning for one or more APs from a first scan period into a second scan period when the at least one distance is within a predetermined distance and adjust the scan period in response to the at least one distance when the at least one distance is not within the predetermined distance;
    wherein the second scan period is shorter than the first scan period.

19. The apparatus of claim 18, wherein the controller is configured to:
    identify multiple distances between the current position of the portable terminal and multiple predetermined APs;
    identify a shortest distance among the multiple distances; and
    select whether to (i) adjust the first scan period into the second scan period or (ii) adjust the first scan period in response to the shortest distance.

20. The apparatus of claim 19, wherein the controller is configured to adjust the first scan period into a minimum period when the shortest distance is within the predetermined distance.

* * * * *